United States Patent
Mulani et al.

(10) Patent No.: US 10,860,228 B1
(45) Date of Patent: Dec. 8, 2020

(54) METHOD TO SWITCH BETWEEN TRADITIONAL SSD AND OPEN-CHANNEL SSD WITHOUT DATA LOSS

(71) Applicant: Western Digital Technologies, Inc., San Jose, CA (US)

(72) Inventors: Jameer Mulani, Bangalore (IN); Anindya Rai, Bangalore (IN); Saugata Das Purkayastha, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 16/449,718

(22) Filed: Jun. 24, 2019

(51) Int. Cl.
*G06F 3/06* (2006.01)
*G06F 12/1009* (2016.01)

(52) U.S. Cl.
CPC .......... *G06F 3/0634* (2013.01); *G06F 3/0604* (2013.01); *G06F 3/0659* (2013.01); *G06F 3/0679* (2013.01); *G06F 12/1009* (2013.01); *G06F 2212/7201* (2013.01)

(58) Field of Classification Search
CPC .... G06F 3/0634; G06F 3/0679; G06F 3/0604; G06F 3/0659; G06F 12/1009; G06F 2212/7201
See application file for complete search history.

(56) References Cited

U.S. PATENT DOCUMENTS

| | | |
|---|---|---|
| 2015/0331624 A1 | 11/2015 | Law |
| 2017/0109089 A1 | 4/2017 | Huang |
| 2017/0351427 A1 | 12/2017 | Klein |
| 2018/0011762 A1 | 1/2018 | Klein |
| 2019/0004944 A1* | 1/2019 | Widder ............... G06F 12/0292 |
| 2019/0004964 A1* | 1/2019 | Kanno .................. G06F 3/0679 |

(Continued)

FOREIGN PATENT DOCUMENTS

| | | |
|---|---|---|
| KR | 2008/0056491 A | 6/2008 |
| WO | WO 2017/209813 A1 | 12/2017 |

OTHER PUBLICATIONS

Du, Yu, et al., "In Pursuit of Optimal Storage Performance: Hardware/Software Co-Design with Dual-Mode SSD," Alibaba Group, [https://ossbucket-us-west.oss-us-west-1.aliyuncs.com/alibaba_dual_mode_ssd2.pdf], Mar. 2018, 23 pages.

(Continued)

*Primary Examiner* — Larry T Mackall
(74) *Attorney, Agent, or Firm* — Vierra Magen Marcus LLP

(57) ABSTRACT

Apparatuses and techniques are provided for switching a solid-state device (SSD) between a traditional SSD mode and an open-channel SSD (OCSSD) mode. In one aspect, a set of commands are defined for communicating different types of data from a Flash Translation Layer (FTL) between the host and SSD. The commands can include different predetermined sets of bits which carry different types of FTL data in a standardized format. The commands can be transmitted using reserved data words in an interface specification which interfaces the host to the SSD. The commands can include commands to transfer a logical-to-physical address table, a validity bitmap and a wear table. A switch mode command can include a bit indicating whether the mode is to be switched from traditional SSD to OCSSD, or from OCSSD to traditional SSD.

20 Claims, 11 Drawing Sheets

(56) References Cited

U.S. PATENT DOCUMENTS

2019/0129838 A1    5/2019   Yoshida et al.
2019/0384506 A1*  12/2019   Shivanand .............. G06F 3/064

OTHER PUBLICATIONS

SiliconMotion, "Silicon Motion Announces New Dual-Mode Enterprise Class SSD Controller Solution at 2018 Flash Memory Summit," Press Release, [http://www.siliconmotion.com/A6.1.Detail_News.php?sn=239], Aug. 7, 2018, 4 pages.
Caufield, Laura, "Project Denali to define flexible SSDs for cloud-scale applications," Blog, Microsoft Azure, [https://azure.microsoft.com/en-in/blog/project-denali-to-define-flexible-ssds-for-cloud-scale-applications], Sep. 7, 2018, 7 pages.
Alibaba Clouder, "Alibaba Cloud Launches Dual-mode SSD to Optimize Hyper-scale Infrastructure Performance," [https://www.alibabacloud.com/blog/alibaba-cloud-launches-dual-mode-ssd-to-optimize-hyper-scale-infrastructure-performance_558010], Mar. 21, 2018, 7 pages.
Park, Chanik, et al., "A Reconfigurable FTL (Flash Translation Layer) Architecture for NAND Flash-Based Applications," ACM Transactions on Embedded Computing Systems, vol. 7, No. 4, Article 38, Jul. 2008, 23 pages.
NVM Express, "Base Specification," NVM Express, Rev. 1.3d, Mar. 20, 2019, 298 pages.
Bjorling, Matias, "Open-Channel SSDs Then. Now. and Beyond.," CNEXLabs, Mar. 22, 2017, 25 pages.
"Open-Channel Solid State Drives Specification," LightNVM, Revision 2.0, [lightnvm.io/docs/OCSSD-2_0-20180129.pdf], Jan. 29, 2018, 29 pages.
Jhin, Jhuyeong, et al., "Optimizing host-level flash translation layer with considering storage stack of host systems," Proceedings of the 12th International Conference on Ubiquitous Information Management and Communication, pp. 1-4, Jan. 5, 2018.
International Search Report & The Written Opinion of the International Searching Authority dated Apr. 16, 2020, International Application No. PCT/US2019/067001.
English Abstract of Korean Publication No. KR2008/0056491 published Jun. 23, 2008.

* cited by examiner

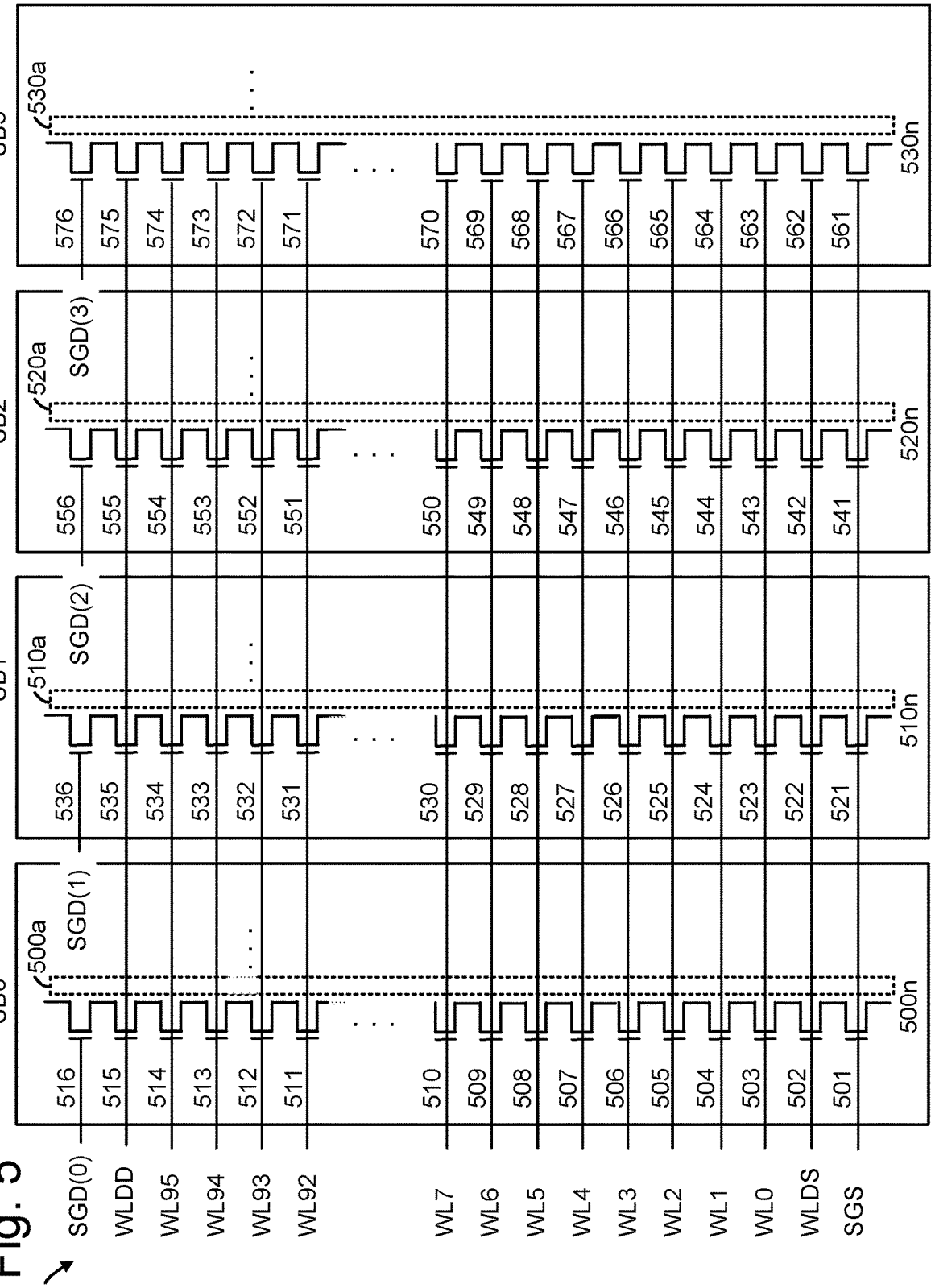

Fig. 10A

| Host file system table 900 | |
|---|---|
| File name | Logical address |
| file 1, sector 0 | 0 |
| file 1, sector 1 | 1 |
| file 1, sector 2 | 2 |
| file 2, sector 0 | 3 |
| file 2, sector 1 | 4 |
| file 2, sector 2 | 5 |
| file 3, sector 0 | 6 |
| file 3, sector 1 | 7 |
| file 3, sector 2 | 8 |

Fig. 10B

| L2P table 910 | |
|---|---|
| Logical address | Physical address |
| 0 | block 0, page 0 |
| 1 | block 0, page 1 |
| 2 | block 0, page 2 |
| 3 | block 1, page 0 |
| 4 | block 1, page 1 |
| 5 | block 1, page 2 |
| 6 | block 1, page 3 |
| 7 | block 1, page 4 |
| 8 | block 1, page 5 |

Fig. 10C

| Validity bitmap 911 (block 0) | |
|---|---|
| Bit | Definition |
| 1 | valid |
| 1 | valid |
| 1 | valid |
| 0 | invalid |
| 1 | valid |
| 1 | valid |
| . | |
| . | |
| . | |

Fig. 10D

| Wear table 912 | |
|---|---|
| Block | P-E cycles |
| 0 | 1200 |
| 1 | 1250 |
| 2 | 1175 |
| 3 | 1190 |
| . | |
| . | |
| . | |

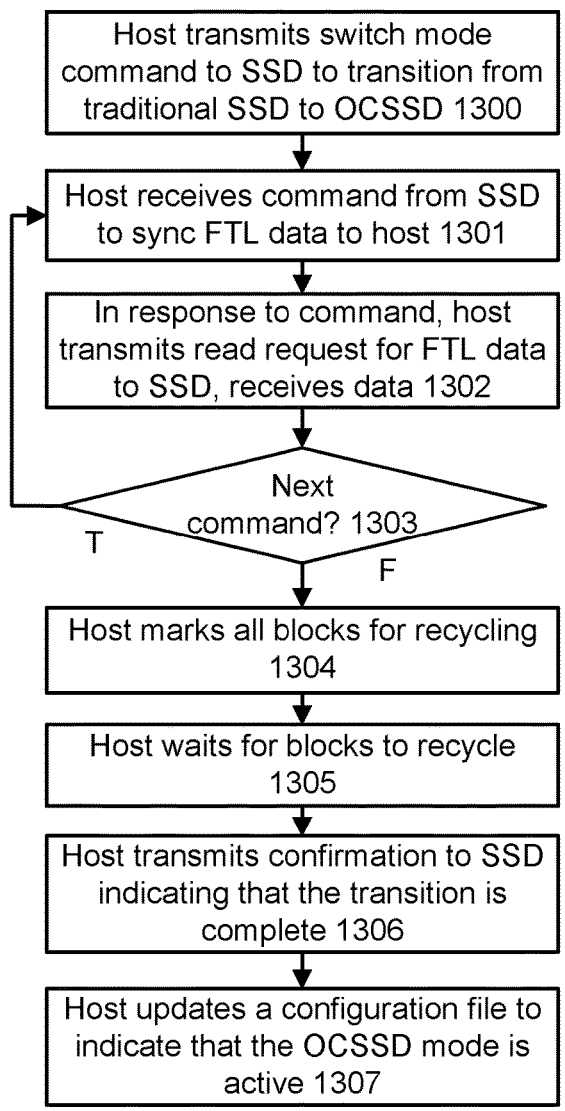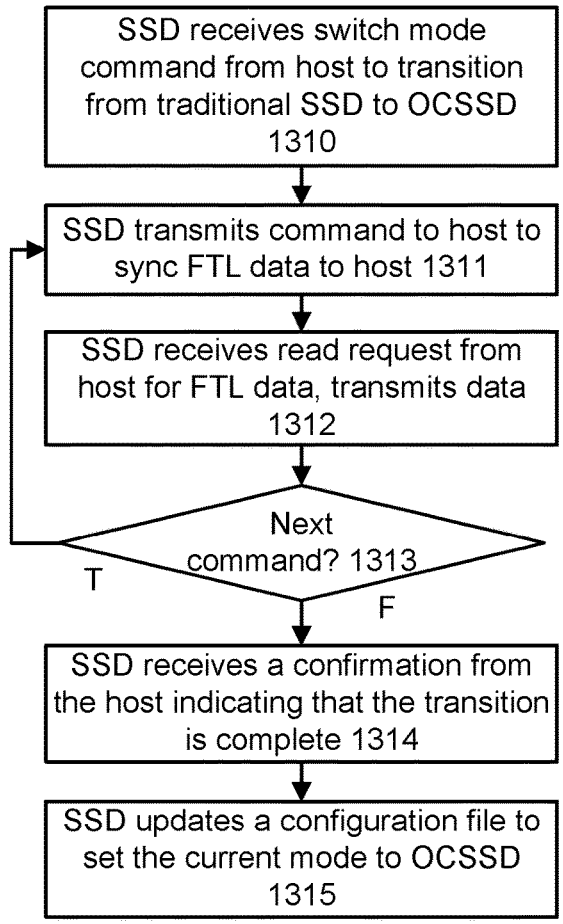
Fig. 13A
Fig. 13B

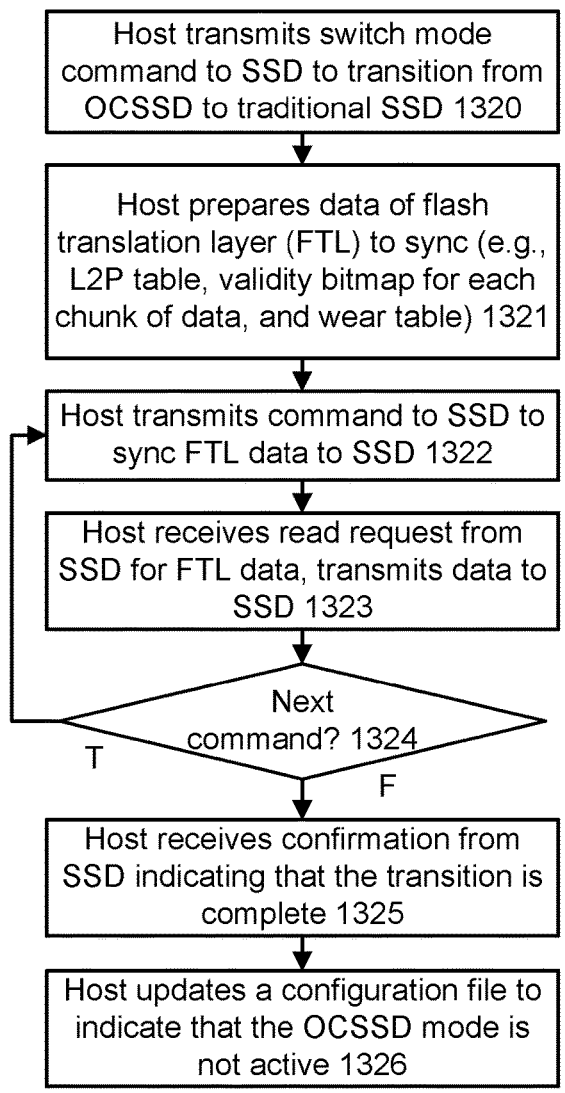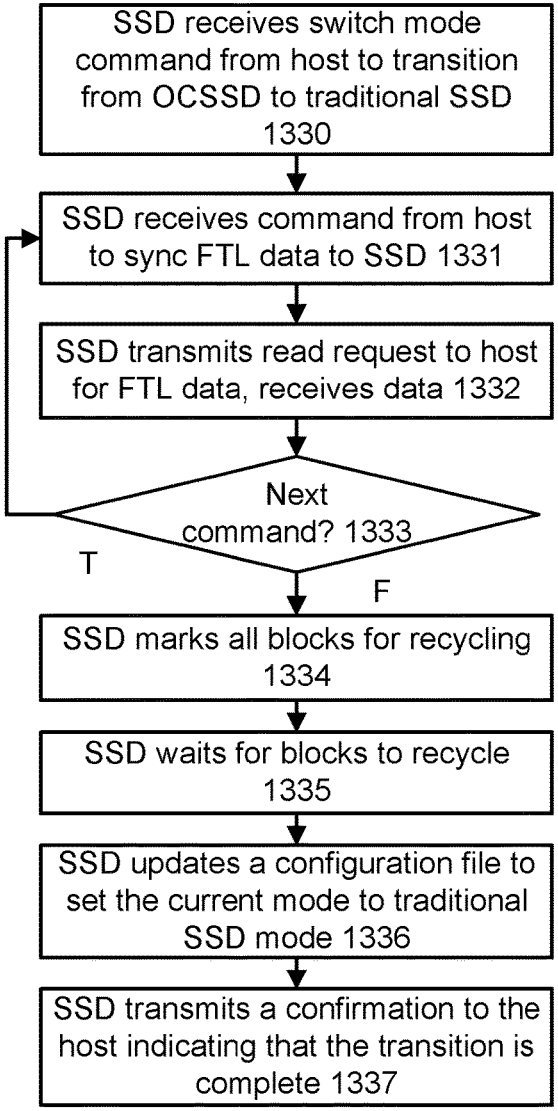

METHOD TO SWITCH BETWEEN TRADITIONAL SSD AND OPEN-CHANNEL SSD WITHOUT DATA LOSS

BACKGROUND

The present technology relates to the operation of storage and memory devices.

Semiconductor memory devices have become more popular for use in various electronic devices. For example, non-volatile semiconductor memory is used in cellular telephones, digital cameras, personal digital assistants, mobile computing devices, non-mobile computing devices and other devices.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

A memory device includes memory cells which may be arranged in series, in NAND strings (e.g., NAND chains), for instance, where select gate transistors are provided at the ends of a NAND string to selectively connect a channel of the NAND string to a source line or bit line. However, various challenges are presented in operating such memory devices.

BRIEF DESCRIPTION OF THE DRAWINGS

FIG. 5 depicts an example view of NAND strings in a block BLK0 which is consistent with FIG. 3.

FIG. 10A depicts an example of the host file system table 900 of FIG. 9.

FIG. 10B depicts an example of the L2P table 910 of FIG. 9.

FIG. 10C depicts an example of the validity bitmap 911 of FIG. 9.

FIG. 10D depicts an example of the wear table 912 of FIG. 9.

FIG. 13A depicts an example process at a host for transitioning an SSD from a traditional SSD to an OCSSD.

FIG. 13B depicts an example process at an SSD which is a counterpart of the process of FIG. 13A.

FIG. 13C depicts an example process at a host for transitioning an SSD from an OCSSD to a traditional SSD.

FIG. 13D depicts an example process at an SSD which is a counterpart of the process of FIG. 13C.

DETAILED DESCRIPTION

Apparatuses and techniques are provided for switching a solid-state device (SSD) between a traditional SSD mode and an open-channel SSD mode.

Figure 3:
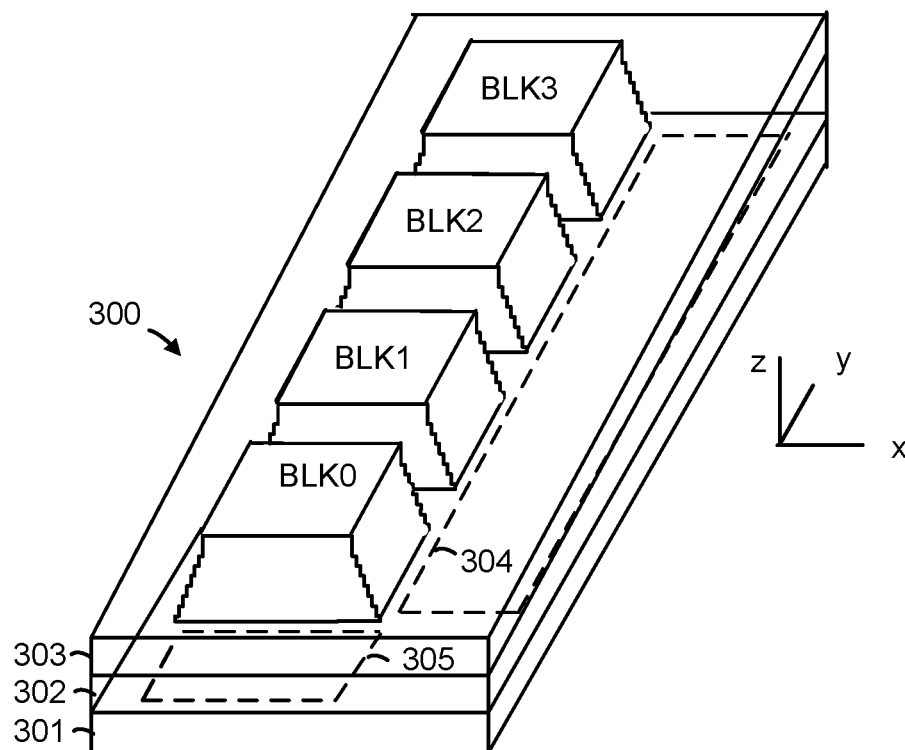
FIG. 3 is a perspective view of a memory device 300 comprising a set of blocks in an example 3D configuration of the memory structure 126 of FIG. 1.

In a memory device, memory cells can be arranged in blocks, such as depicted in FIG. 3. The memory cells can be joined to one another, e.g., in NAND strings, such as depicted in FIG. 5. Further, the memory cells can be arranged in a 2D or 3D structure. In a 3D memory structure, the memory cells may be arranged in vertical NAND strings in a stack, where the stack comprises alternating conductive and dielectric layers. The conductive layers act as word lines which are connected to the memory cells. Each NAND string may have the shape of a pillar which intersects with the word lines to form the memory cells. In a 2D memory structure, the memory cells may be arranged in horizontal NAND strings on a substrate.

The memory cells in a block can be subject to program, read and erase operations. A programming operation may include one or more sets of increasing program voltages or pulses which are applied to a word line in respective program loops or program-verify iterations. Verify tests may be performed after each program voltage to determine whether the memory cells have completed programming. When programming is completed for a memory cell, it can be locked out from further programming while programming continues for other memory cells in subsequent program loops.

Figure 6A:
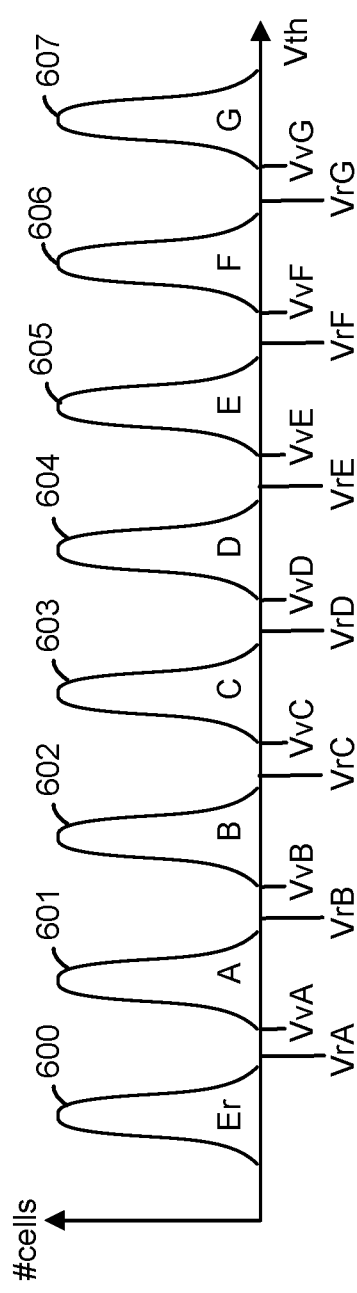
FIG. 6A depicts an example Vth distribution of memory cells, where eight data states are used in an example of MLC programming.
Figure 6B:
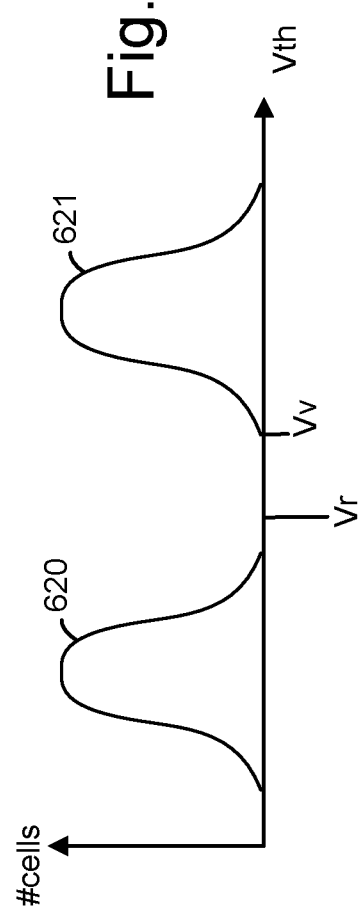
FIG. 6B depicts an example Vth distribution of memory cells, where two data states are used in SLC programming.

Each memory cell may be associated with a data state according to write data in a program command. Based on its data state, a memory cell will either remain in the erased (Er) state or be programmed to a programmed data state. For example, in a one bit per cell block, also referred to as a SLC (single level cell) block, there are two data states including the erased state and the programmed state, as depicted in FIG. 6B. In a two-bit per cell block, there are four data states including the erased state and three programmed data states referred to as the A, B and C data states. In a three-bit per cell block, there are eight data states including the erased state and seven programmed data states referred to as the A, B, C, D, E, F and G data states, as depicted in FIG. 6A. In a four-bit per cell block, there are sixteen data states including the erased state S0 and fifteen programmed data states S1-S15. Each data state can be represented by a range of threshold voltages (Vth) in the memory cells. A block with two or more bits per cell is referred to as an MLC (multi-level cell) block.

After the memory cells are programmed, the data can be read back in a read operation. A read operation can involve applying a series of read voltages to a word line while sensing circuitry determines whether cells connected to the word line are in a conductive (turned on) or non-conductive (turned off) state. If a cell is in a non-conductive state, the Vth of the memory cell exceeds the read voltage. The read voltages are set at levels which are expected to be between the threshold voltage levels of adjacent data states. Moreover, during the read operation, the voltages of the unselected word lines are ramped up to a read pass level or turn on level which is high enough to place the unselected memory cells in a strongly conductive state, to avoid interfering with the sensing of the selected memory cells. A word line which is being programmed or read is referred to as a selected word line, WLn.

Moreover, the memory cells can be arranged in a storage device such as a solid-state device (SSD). The SSD is typically configured to implement processes for arranging and managing the blocks of memory cells using a mechanism referred to as a Flash Translation Layer (FTL). The FTL can be implemented by firmware in the controller, for example. The FTL can be used for processes such as managing the writes to backend NAND devices with wear levelling, maintaining a logical to physical (L2P) mapping table and providing a logical block number interface to a host. In a traditional SSD, the SSD implements and controls the FTL.

However, various advantages can be achieved by implementing or controlling some of the FTL processes at the host instead of at the SSD. In this case, the SSD is referred as open-channel SSD (OCSSD). For example, the host can manage the L2P table and the wear leveling of the NAND memory cells. In this case, the SSD is responsible for processes such as low-level transfers to and from the memory cells, and providing a physical page number interface to the host.

An SSD is typically configured as a traditional SSD or an OCSSD at the time of manufacture, such that a subsequent change of functionality from a traditional SSD to an OCSSD, or from an OCSSD to a traditional SSD, results in a loss of data. In particular, the SSD has to be completely reformatted once its role is switched since FTL metadata as managed by the host, in the case of OCSSD, or by the SSD, in the case of a traditional SSD, may not be compatible. The reason that the FTL metadata is incompatible between the SSD and the host is that typically the data structures for the FTL metadata for the host have been developed independently from the data structures for the FTL metadata for the SSD. The host and SSD designers develop their data structures based on their respective resources and operating environments. For example, the data structures for the host can take advantage of the typically greater hardware resources at the host compared to the SSD.

The format of the FTL data structures can be characterized by many variables. One possible variable is whether the data is compressed or uncompressed and the type of compression used, if applicable. Another possible variable is a type of character encoding, e.g., ASCII, Unicode or UTF-8.

Another possible variable is a type of storage format such as XML, CSV or TSV. Extensible Markup Language (XML) is a markup language that defines a set of rules for encoding documents in a format that is both human-readable and machine-readable. A comma-separated values (CSV) file is a delimited text file that uses a comma to separate values. A CSV file stores tabular data (numbers and text) in plain text. Each line of the file is a data record and each record comprises one or more fields, separated by commas. A tab-separated values (TSV) file is a text format for storing data in a tabular structure. Each record in the table is one line of the text file. Each field value of a record is separated from the next by a tab character. The CSV and TSV formats are examples of a delimiter-separated format.

Another possible variable is a type of error correction code. Another possible variable is a number of bits or bytes allocated to each data value. Another possible variable is whether the data is stored using a Big-Endian byte order, in which the most significant byte of the data is placed at the byte with the lowest address, or using the Little-Endian byte order, in which the least significant byte of the data is placed at the byte with the lowest address.

Techniques provided herein address the above and other issues. In one approach, techniques are provided for transitioning an SSD from a traditional SSD, in which a control circuit of the SSD manages flash translation layer processes for a plurality of blocks of memory cells, to an OCSSD, in which a host manages at least some of the flash translation layer processes. In another approach, techniques are provided for transitioning an SSD from an OCSSD to a traditional SSD. A set of commands are defined for communicating different types of FTL data between the host and SSD. The commands can included different predetermined sets of bits which carry different types of information. The commands can be transmitted using reserved data words in an interface specification such as the Open-Channel Solid-State Drives Specification, which interfaces the host to the solid-state device. Regardless of the use of different data structures in the host and SSD, the techniques described herein allow the FTL data to be communicated between the host and the SSD in a standard, understandable format, thereby providing compatibility.

For example, a command to transfer a logical-to-physical address table can include a scatter gather list entry of the logical-to-physical address table, a maximum logical block address, a size of the logical-to-physical address table, and a bit indicating whether the logical-to-physical address table is to be copied to the host or SSD. A command to transfer a validity bitmap can include a scatter gather list entry of the validity bitmap, a size of the validity bitmap and a bit indicating whether the validity bitmap is to be copied to the host or SSD. A command to transfer a wear table can include bits identifying a scatter gather list entry of the wear table, bits indicating a size of the wear table, and a bit indicating whether the wear table is to be copied to the host. A switch mode command can include a bit indicating whether the mode is to be switched from traditional SSD to OCSSD, or from OCSSD to traditional SSD.

In an example application, the techniques can be used at a data center which has petabytes of storage attached in the form of multiple OCSSDs. For maintenance purposes, some OCSSDs might have to be placed offline or moved to a different server with a different global FTL. The techniques provided herein allow this to be done without losing data. It provides flexibility to move an OCSSD from one server to another server without data loss and removes the dependency on a particular server. Moreover, since the same SSD can be used in both modes, it provides flexibility to choose from a number of use cases. Depending on the type of application to run, the host can decide how much I/O command latency determinism is needed, and then configure sets of SSDs to be OCSSDs or traditional SSDs.

This mode transition mechanism can also be used at flash memory arrays. Depending upon an application's latency requirements, the host might use an array partially as an OCSSD (where the host maintains the FTL data) and partially as a traditional flash array where the array maintains the FTL data. The host can change the storage allocated to each run time based on latency requirement and L2P storage available during runtime without data loss.

These and other features are discussed further below.

Figure 1:
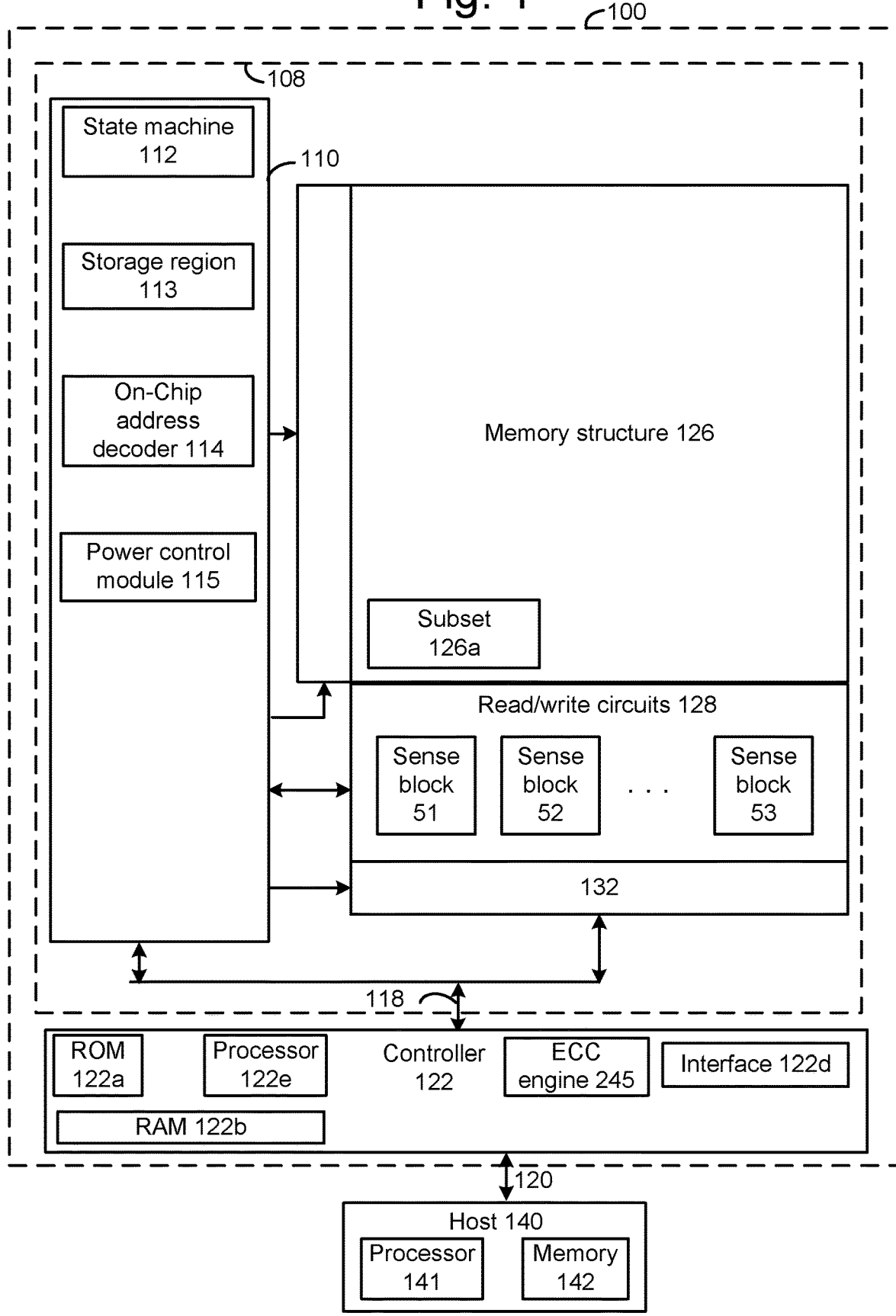
FIG. 1 is a block diagram of an example storage device.

FIG. 1 is a block diagram of an example storage device. The memory device 100, such as a non-volatile storage system, may include one or more memory die 108. The memory die 108, or chip, includes a memory structure 126 of memory cells, such as an array of memory cells, control circuitry 110, and read/write circuits 128. The memory structure 126 is addressable by word lines via a row decoder 124 and by bit lines via a column decoder 132. The read/write circuits 128 include multiple sense blocks 51, 52, . . . 53 (sensing circuitry) and allow a page of memory cells to be read or programmed in parallel. Typically a controller 122 is included in the same memory device 100 (e.g., a removable storage card) as the one or more memory die 108. The controller may be separate from the memory die. Commands and data are transferred between the host 140 and controller 122 via a data bus 120, and between the controller and the one or more memory die 108 via lines 118.

The memory structure can be 2D or 3D. The memory structure may comprise one or more array of memory cells including a 3D array. The memory structure may comprise a monolithic 3D memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

The control circuitry 110 cooperates with the read/write circuits 128 to perform memory operations on the memory structure 126, and includes a state machine, an on-chip address decoder 114, and a power control module 115 (power control circuit). A storage region 113 may be provided, e.g., for operational parameters and software/code. In one embodiment, the state machine is programmable by the software. In other embodiments, the state machine does not use software and is completely implemented in hardware (e.g., electrical circuits).

The on-chip address decoder 114 provides an address interface between that used by the host or a memory controller to the hardware address used by the decoders 124 and 132. The power control module 115 controls the power and voltages supplied to the word lines, select gate lines, bit lines and source lines during memory operations. It can include drivers for word lines, SGS and SGD transistors and source lines. The sense blocks can include bit line drivers, in one approach.

In some implementations, some of the components can be combined. In various designs, one or more of the components (alone or in combination), other than memory structure 126, can be thought of as at least one control circuit which is configured to perform the techniques described herein including the steps of the processes described herein. For example, a control circuit may include any one of, or a combination of, control circuitry 110, state machine 112, decoders 114 and 132, power control module 115, sense blocks 51, 52, . . . , 53, read/write circuits 128, controller 122, and so forth.

The off-chip controller 122 (which in one embodiment is an electrical circuit) may comprise a processor 122e, memory such as ROM 122a and RAM 122b and an error-correction code (ECC) engine 245. The ECC engine can correct a number of read errors. The RAM 122b can be a DRAM, for instance. A copy of data to be programmed is received from the host and stored temporarily in the RAM until the programming is successfully completed to blocks in the memory device. The RAM may store one or more word lines of data.

A memory interface 122d may also be provided. The memory interface, in communication with ROM, RAM and processor, is an electrical circuit that provides an electrical interface between the controller and the memory die. For example, the memory interface can change the format or timing of signals, provide a buffer, isolate from surges, latch I/O and so forth. The processor can issue commands to the control circuitry 110 (or any other component of the memory die) via the memory interface 122d.

The memory in the controller 122, such as such as ROM 122a and RAM 122b, comprises code such as a set of instructions, and the processor is operable to execute the set of instructions to provide the functionality described herein. Alternatively or additionally, the processor can access code from a subset 126a of the memory structure, such as a reserved area of memory cells in one or more word lines.

For example, code can be used by the controller to access the memory structure such as for programming, read and erase operations. The code can include boot code and control code (e.g., a set of instructions). The boot code is software that initializes the controller during a booting or startup process and enables the controller to access the memory structure. The code can be used by the controller to control one or more memory structures. Upon being powered up, the processor 122e fetches the boot code from the ROM 122a or the subset 126a of the memory structure for execution, and the boot code initializes the system components and loads the control code into the RAM 122b. Once the control code is loaded into the RAM, it is executed by the processor. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below. A control circuit can be configured to execute the instructions to perform the functions described herein.

The host 140 can include a processor 141 and memory 142 for performing the functions described herein.

In one embodiment, the host is a computing device (e.g., laptop, desktop, smartphone, tablet, digital camera) that includes one or more processors, one or more processor readable memory devices (RAM, ROM, flash memory, hard disk drive, solid-state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory (DRAM) or static random access memory (SRAM) devices, non-volatile memory devices, such as resistive random access memory (ReRAM), electrically erasable programmable read-only memory (EEPROM), flash memory (which can also be considered a subset of EEPROM), ferroelectric random access memory (FRAM), and magnetoresistive random access memory (MRAM), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a 2D memory structure or a 3D memory structure.

In a 2D memory structure, the semiconductor memory elements are arranged in a single plane or a single memory device level. Typically, in a 2D memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A 3D memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements. The columns may be arranged in a 2D configuration, e.g., in an x-y plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

2D arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this technology is not limited to the 2D and 3D exemplary structures described but covers all relevant memory structures within the spirit and scope of the technology as described herein and as understood by one of skill in the art.

Figure 2:
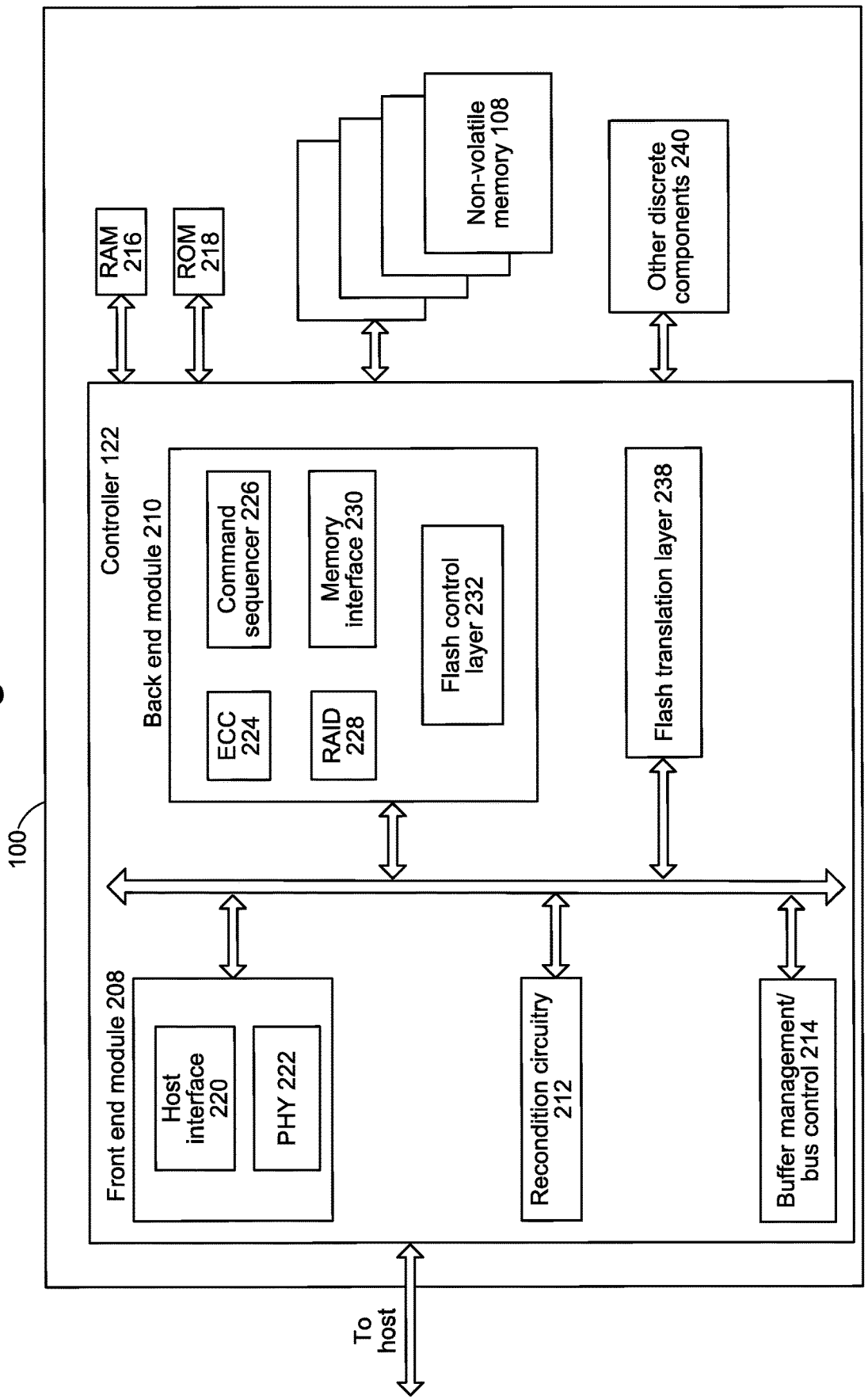
FIG. 2 is a block diagram of the example storage device 100 of FIG. 1, depicting additional details of the controller 122.

FIG. 2 is a block diagram of the example storage device 100 (memory device) of FIG. 1, depicting additional details of the controller 122. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host can provide the physical address. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 122 and non-volatile memory die 108 may be any suitable flash interface. In one embodiment, the storage device 100 may be a card based system, such as a secure digital (SD) or a micro secure digital (micro-SD) card. In an alternate embodiment, the memory system may be part of an embedded memory system. For example, the flash memory may be embedded within the host, such as in the form of a solid-state disk (SSD) drive installed in a personal computer.

In some embodiments, the storage device 100 includes a single channel between the controller 122 and the non-volatile memory die 108, the subject matter described herein is not limited to having a single memory channel.

The controller 122 includes a front end module 208 that interfaces with a host, a back end module 210 that interfaces with the one or more non-volatile memory die 108, and various other modules that perform functions which will now be described in detail.

The components of the controller may take the form of a packaged functional hardware unit (e.g., an electrical circuit) designed for use with other components, a portion of a program code (e.g., software or firmware) executable by a processor, e.g., microprocessor, or processing circuitry that usually performs a particular function of related functions, or a self-contained hardware or software component that interfaces with a larger system, for example. For example, each module may include an Application Specific Integrated Circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for the controller to perform the functions described herein. The architecture depicted in FIG. 2 is one example implementation that may (or may not) use the components of the controller 122 depicted in FIG. 1 (e.g., RAM, ROM, processor, interface).

The controller 122 may include recondition circuitry 212, which is used for reconditioning memory cells or blocks of memory. The reconditioning may include refreshing data in its current location or reprogramming data into a new word line or block as part of performing erratic word line maintenance, as described below.

Referring again to modules of the controller 122, a buffer manager/bus controller 214 manages buffers in random access memory (RAM) 216 and controls the internal bus arbitration of Controller 122. The RAM may include DRAM and/or SRAM. DRAM or Dynamic Random Access Memory is a type of semiconductor memory in which the memory is stored in the form of a charge. Each memory cell in a DRAM is made of a transistor and a capacitor. The data is stored in the capacitor. Capacitors loose charge due to leakage and hence DRAMs are volatile devices. To keep the data in the memory, the device must be regularly refreshed. In contrast, SRAM or Static Random Access Memory will retain a value as long as power is supplied.

A read only memory (ROM) 218 stores system boot code. Although illustrated in FIG. 2 as being located separately from the controller, in other embodiments, one or both of the RAM 216 and ROM 218 may be located within the controller. In yet other embodiments, portions of RAM and ROM may be located both within the controller 122 and outside the controller. Further, in some implementations, the controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back end module 210 includes an error correction controller (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the storage device 100. In some cases, the RAID module 228 may be a part of the ECC engine 224. Note that the RAID parity may be added as an extra die or dies as implied by the common name, but it may also be added within the existing die, e.g. as an extra plane, or extra block, or extra word lines within a block. A memory interface 230 provides the command sequences to non-volatile memory die 108 and receives status information from the non-volatile memory die. A flash control layer 232 controls the overall operation of back end module 210.

Additional components of storage device 100 include a Flash Translation Layer (FTL) 238, which performs processes such as wear leveling of memory cells of non-volatile memory die 108. The memory system also includes other discrete components 240, such as external electrical interfaces, external RAM, resistors, capacitors, or other components that may interface with Controller 122. In alternative embodiments, one or more of the physical layer interface 222, RAID module 228 and buffer management/bus controller 214 are optional components that are not necessary in the Controller 122.

The FTL, also referred to as a Media Management Layer (MML), may be integrated as part of the flash management that may handle flash errors and interfacing with the host. In particular, the FTL may be a module in flash management and may be responsible for the internals of NAND management. The FTL may include an algorithm in the memory device firmware which translates writes from the host into writes to the memory structure 126, e.g., flash memory, of die 108. The FTL may implement the file system tables discussed further below. The FTL may be needed because: 1) the flash memory may have limited endurance; 2) the flash memory may only be written in multiples of pages; and/or 3) the flash memory may not be written unless it is erased as a block. The FTL understands these potential limitations of the flash memory which may not be visible to the host. Accordingly, the FTL attempts to translate the writes from host into writes into the flash memory. Erratic bits may be identified and recorded using the FTL. This recording of erratic bits can be used for evaluating the health of blocks and/or word lines (the memory cells on the word lines).

Figure 9:
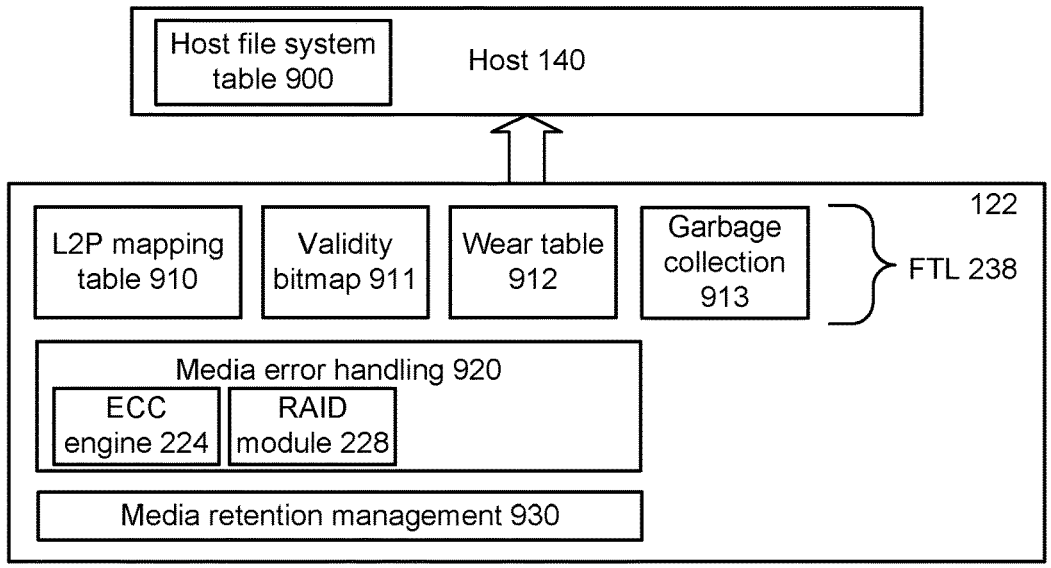
FIG. 9 depicts example processes of the controller 122 and host 140 of FIG. 1.

See also FIG. 9 for further details of the FTL and other processes.

The controller 122 may interface with one or more memory dies 108. In in one embodiment, the controller and multiple memory dies (together comprising the storage device 100) implement a solid-state drive, which can emulate, replace or be used instead of a hard disk drive inside a host, as a network-attached storage (NAS) device, and so forth. Additionally, the solid-state drive need not be made to work as a hard drive.

FIG. 3 is a perspective view of a memory device 300 comprising a set of blocks in an example 3D configuration of the memory structure 126 of FIG. 1. On the substrate are example blocks BLK0, BLK1, BLK2 and BLK3 of memory cells (storage elements) and peripheral areas with circuitry for use by the blocks. The peripheral area 304 runs along an edge of each block while the peripheral area 305 is at an end of the set of blocks. The circuitry can include voltage drivers which can be connected to control gate layers, bit lines and source lines of the blocks. In one approach, control gate layers at a common height in the blocks are commonly driven. The substrate 301 can also carry circuitry under the blocks, and one or more lower metal layers which are patterned in conductive paths to carry signals of the circuitry. The blocks are formed in an intermediate region 302 of the memory device. In an upper region 303 of the memory device, one or more upper metal layers are patterned in conductive paths to carry signals of the circuitry. Each block comprises a stacked area of memory cells, where alternating levels of the stack represent word lines. In one possible approach, each block has opposing tiered sides from which vertical contacts extend upward to an upper metal layer to form connections to conductive paths. While four blocks are depicted as an example, two or more blocks can be used, extending in the x- and/or y-directions.

In one possible approach, the blocks are in a plane, and the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device. The blocks could also be arranged in multiple planes.

Figure 4:
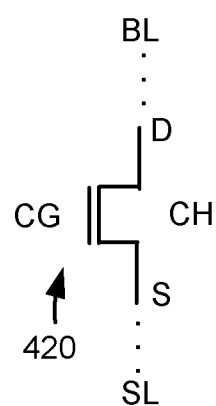
FIG. 4 depicts an example transistor 420.

FIG. 4 depicts an example transistor 420. The transistor comprises a control gate CG, a drain D, a source S and a channel CH and may represent a memory cell or a select gate transistor, for example. The drain end of the transistor is connected to a bit line BL optionally via one or more other transistors in a NAND string, and the source end of the transistor is connected to a source line SL optionally via one or more other transistors in a NAND string, In one approach, the block of memory cells comprises a stack of alternating control gate and dielectric layers, and the memory cells are arranged in vertically extending memory holes in the stack.

A number of layers can be deposited along sidewalls of the memory holes and/or within each word line layer to form memory cells. The layers can include a blocking oxide layer, a charge-trapping layer or film such as silicon nitride (Si3N4) or other nitride, a tunneling layer (e.g., a gate oxide) and a channel (e.g., comprising polysilicon). A dielectric core (e.g., comprising silicon dioxide) may fill a central core of each memory hole.

While the above example is directed to a 3D memory device with vertically extending NAND strings, the techniques provided herein are also applicable to a 2D memory device in which the NAND strings extend horizontally on a substrate.

FIG. 5 depicts an example view of NAND strings in a block BLK0 which is consistent with FIG. 3. The NAND strings are arranged in sub-blocks of the block in a 3D configuration. Each sub-block includes multiple NAND strings, where one example NAND string is depicted. For example, SB0, SB1, SB2 and SB3 comprise example NAND strings 500n, 510n, 520n and 530n, respectively. The NAND strings have data word lines, dummy word lines and select gate lines. Each sub-block comprises a set of NAND strings which extend in the x direction and which have a common SGD line or control gate layer. The NAND strings 500n, 510n, 520n and 530n are in sub-blocks SB0, SB1, SB2 and SB3, respectively. Programming of the block may occur based on a word line programming order. One option is to program the memory cells in different portions of a word line which are in the different sub-blocks, one sub-block at a time, before programming the memory cells of the next word line. For example, this can involve programming WL0 in SB0, SB1, SB2 and then SB2, then programming WL1 in SB0, SB1, SB2 and then SB2, and so forth. The word line programming order may start at WL0, the source-end word line and end at WL95, the drain-end word line, for example.

The NAND strings 500n, 510n, 520n and 530n have channels 500a, 510a, 520a and 530a, respectively. Additionally, NAND string 500n includes SGS transistor 501, dummy memory cell 502, data memory cells 503-514, dummy memory cell 515 and SGD transistor 516. NAND string 510n includes SGS transistor 521, dummy memory cell 522, data memory cells 523-534, dummy memory cell 535 and SGD transistor 536. NAND string 520n includes SGS transistor 541, dummy memory cell 542, data memory cells 543-554, dummy memory cell 555 and SGD transistor 556. NAND string 530n includes SGS transistor 561, dummy memory cell 562, data memory cells 563-574, dummy memory cell 575 and SGD transistor 576.

This example depicts one SGD transistor at the drain-end of each NAND string, and one SGS transistor at the source-end of each NAND string. The SGD transistors in SB0, SB1, SB2 and SB3 may be driven by separate control lines SGD(0), SGD(1), SGD(2) and SGD(3), respectively, in one approach. In another approach, multiple SGD and/or SGS transistors can be provided in a NAND string.

FIG. 6A depicts an example Vth distribution of memory cells, where eight data states are used in an example of MLC programming. In FIGS. 6A and 6B, the vertical axis depicts a number of memory cells on a logarithmic scale, and the horizontal axis depicts a Vth of the memory cells on a linear scale. In one approach, at a start of a program operation, the memory cells are all initially in the erased (Er) state, as represented by the Vth distribution 600. The memory cells assigned to the Er state continue to be represented by the Vth distribution 600 after programming is completed. The memory cells assigned to the A-G states are programmed to the Vth distributions 601-607, respectively, using verify voltages of VvA-VvG, respectively, in program-verify tests. Read voltages VrA-VrG can be used for reading the states of the memory cells in a read operation.

In an erase operation, the data memory cells transition from the Vth distributions of the programmed data states, e.g., states A-G, to the erased state. The erase operation includes an erase phase in which the memory cells are biased for erasing followed by an erase-verify test. The erase-verify test can use an erase-verify voltage, VvEr, which is applied to the word lines.

The Er-G states are examples of assigned data states, and the A-G states are examples of programmed data states, in this eight state example. The number of data states could be higher or low than eight data states.

FIG. 6B depicts an example Vth distribution of memory cells, where two data states are used in SLC programming. An erased state Vth distribution 620 and a programmed state Vth distribution 621 are depicted. The verify voltage is Vv and the read voltage is Vr.

The blocks in a memory device can be allocated as SLC or MLC blocks. SLC blocks have a higher reliability and endurance while MLC blocks have a higher data density but lower endurance. SLC blocks can be used, e.g., as control blocks, which typically require high reliability, or random data blocks or backup blocks, which typically require high endurance. MLC blocks are used primarily as capacity blocks, e.g., blocks which provide the primary long-term storage capacity of the memory device.

Figure 7:
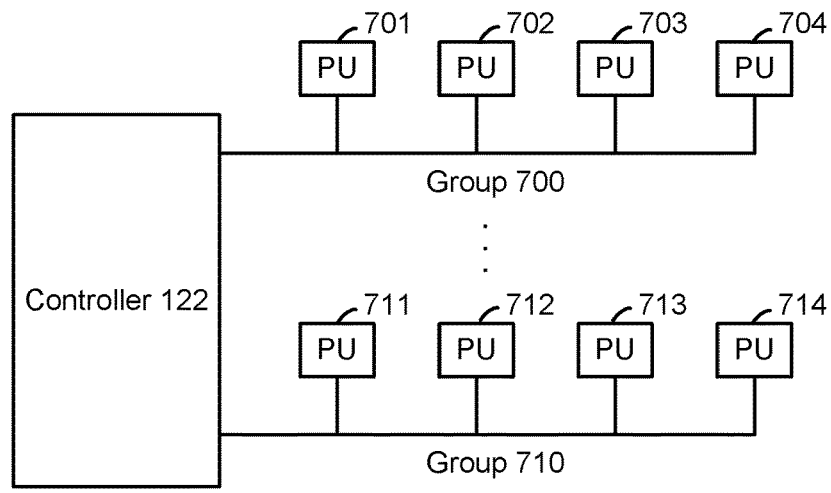
FIG. 7 depicts an example arrangement of the controller 122 of FIG. 1 communicating with blocks of memory cells in groups of parallel units (PU) in the OCSSD mode.
Figure 8:
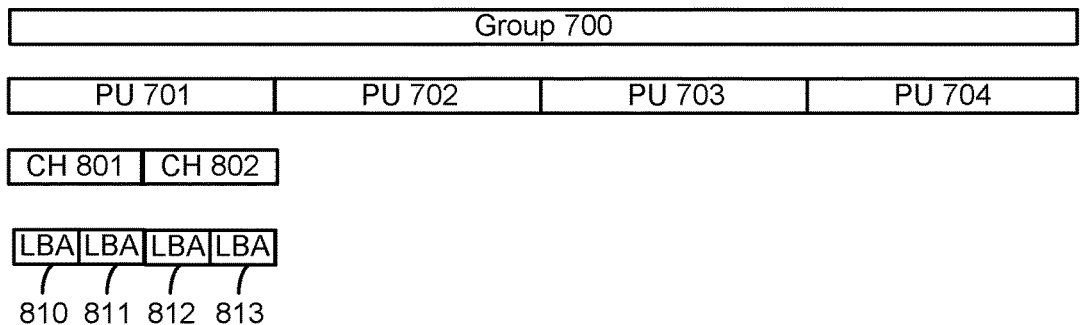
FIG. 8 depicts an example logical block address space, consistent with FIG. 7.

FIG. 7 depicts an example arrangement of the controller 122 of FIG. 1 communicating with blocks of memory cells in groups of parallel units (PU) in the OCSSD mode. To provide input/output isolation, independent parallel units of blocks are allocated, where a group of PUs use a shared bus to transfer data. Each PU can comprise a number of blocks of memory cells, as depicted in FIG. 8. An example group 700 includes PUs 701-704 and an example group 710 includes PUs 711-714. This approach provides a predictable latency for the host. Inputs and outputs can be synchronous for the different parallel units, and the required access time to the parallel units is explicitly defined.

FIG. 8 depicts an example logical block address space 800, consistent with FIG. 7. Details of the group 700 are depicted, including the PUs 701-704. Each PU includes a number of chunks and each chunk comprises a number of logical block addresses (LBAs), For example, the PU 701 includes chunks (CH) 801 and 802. The chunk 801 in turn includes LBAs 810 and 811, and the chunk 802 includes LBAs 812 and 813. A chunk is a range of LBAs where writes must be sequential, and corresponds to one or more blocks of memory cells. A chunk can be in one of four states: free, open, closed or offline. If the writing to a chunk fails, the chunk is marked as being bad.

FIG. 9 depicts example processes of the controller 122 and host 140 of FIG. 1. As discussed previously in connection with FIG. 2, the FTL 238 of the controller 122 can implement various processes for managing the blocks of memory cells. For example, the FTL can include a logical-to-physical (L2P) mapping table 910, which maps logical addresses to physical addresses, a validity bitmap 911, which identifies valid and invalid pages in a block, a wear table 912, which maintains a count of program-erase (P-E) cycles or other wear metric of each physical block, and a garbage collection process 913 which performs processes such as recycling of pages of memory cells.

The controller can also include a media error handling component 920 which includes components such as the ECC engine 224 and the RAID module 228 of FIG. 2. A media retention management component 930 can be used to manage data retention in the memory cells.

The configuration is for the traditional SSD mode. The upward arrow represents the FTL processes being moved to the host to provide the OCSSD mode.

FIG. 10A depicts an example of the host file system table 900 of FIG. 9. When the host reads data from a traditional SSD, the host does not know where the data is stored in the SSD. Similarly, in a program operation, the host does not know the physical location in the SSD in which data will be written. Instead, the data is identified by the host using one or more logical addresses which are mapped to physical or virtual locations, e.g., block and word lines within the block, by a file system. The host file system table cross reference files of data to logical block addresses (LBAs). For example, the file may be divided into sectors. A file can be a video, image, word processing document, application or other data.

The table can cross reference the LBAs to physical or virtual blocks and pages in the memory structure 126. There can be a direct or indirect mapping from the LBAs to physical addresses. In an example of indirect mapping, the LBA of the host is cross-referenced to a virtual address in the memory device, and the virtual address in the memory device is cross-referenced to a physical address. An address which is mapped to or cross references another address is said to point to the other address.

The table includes a column for a file name and a column for a logical address. The file names identifies different files and their sectors. Each sector points to a corresponding logical address. In this simplified example, the logical addresses are consecutive numbers, 0-8. Also, each file has the same number of sectors. In other cases, the logical addresses are non-consecutive and different files can have different numbers of sectors. File 1, sectors 0-2 are associated with logical addresses 0-2, respectively. File 2, sectors 0-2 are associated with logical addresses 3-5, respectively. File 3, sectors 0-2 are associated with logical addresses 6-8, respectively.

FIG. 10B depicts an example of the L2P table 910 of FIG. 9. The table includes a column for the logical address of the host, consistent with FIG. 10A, and a column for a corresponding physical address at the SSD. For example, the data associated with logical addresses 0-2 at the host are stored at block 0, pages 0-2, respectively. The data associated with logical addresses 3-8 at the host are stored at block 1, pages 0-5, respectively. The table is therefore indexed by logical page numbers and each entry identifies a physical page number where the logical page has been stored.

FIG. 10C depicts an example of the validity bitmap 911 of FIG. 9. The validity bitmap can include a bit for each physical page in a block. For instance, a bit of 1 indicates the physical page currently stores valid data and a bit of 0 indicates the physical page currently stores invalid data. Invalid data can include data which has been replaced by new data in a different page. Invalid pages are marked for recycling in a garbage collection process. In this example, block 1, page 0 is marked as being invalid, indicating, e.g., that the logical page was overwritten, and the remaining pages are valid. A validity bitmap can be provided for each erase block or chunk data structure to identify the valid logical pages within that erase block or chunk.

FIG. 10D depicts an example of the wear table 912 of FIG. 9. The first column identifies a block and a second column identifies a corresponding number of P-E cycles or other wear metric. For example, blocks 0-3 have 1200, 1250, 1175 and 1190 P-E cycles, respectively. The wear table can have an entry for each block or chunk showing the current wear of the block or chunk, respectively. It could be number of P-E cycles in one FTL design or some other metric in another FTL design.

The data structures of FIG. 10B-10D can be maintained at the host or the SSD depending on the current mode.

Figure 11A:
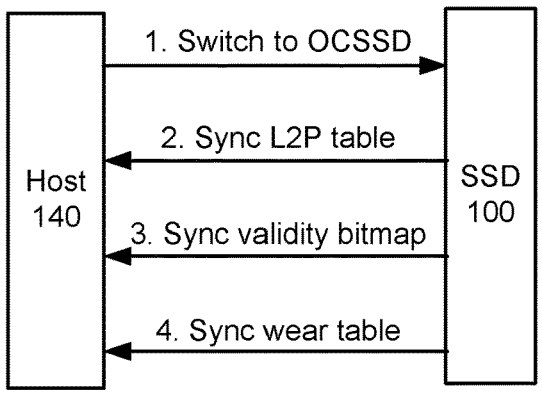
FIG. 11A depicts the communication of commands between the host and SSD in a process for switching the mode of the SSD from a traditional SSD to an open-channel SSD (OCSSD).

FIG. 11A depicts the communication of commands between the host and SSD in a process for switching the mode of the SSD from a traditional SSD to an open-channel SSD (OCSSD). For example, a first command can be a switch mode command which changes the mode of the SSD from a traditional SSD to an OCSSD. This process involves copying FTL data from the SSD to the host. A second command can be an L2P table sync command which causes the host to read an L2P table from an address or addresses provided by the SSD. A third command can be a validity bitmap sync command which causes the host to read a validity bitmap from an address or addresses provided by the SSD. A fourth command can be a wear table sync command which causes the host to read a wear table from an address or addresses provided by the SSD. The addresses identify locations in memory at the SSD from which the FTL data can be read by the host.

The commands can be provided in a format in which different predetermined bits or subsets of bits in a sequence of bits are used for different types of FTL data.

Figure 11B:
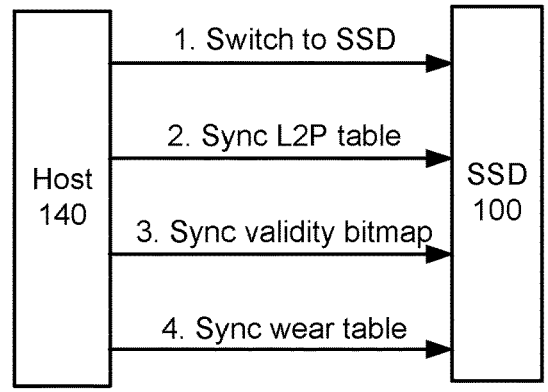
FIG. 11B depicts the communication of commands between the host and SSD in a process for switching the mode of the SSD from an open-channel SSD (OCSSD) to a traditional SSD.

FIG. 11B depicts the communication of commands between the host and SSD in a process for switching the mode of the SSD from an open-channel SSD (OCSSD) to a traditional SSD. In one approach, the host issues a command which switches the mode of the SSD. Alternatively, the SSD or another device issues the command. For example, a first command can be a switch mode command (see FIG. 12A) which changes the mode of the SSD from an OCSSD to a traditional SSD. This process involves copying FTL data from the host to the SSD. A second command can be an L2P table sync command (see FIG. 12B) which causes the SSD to read an L2P table from an address or addresses provided by the host. A third command can be a validity bitmap sync command (see FIG. 12C) which causes the SSD to read a validity bitmap from an address or addresses provided by the host. A fourth command can be a wear table sync command (see FIG. 12D) which causes the SSD to read a wear table from an address or addresses provided by the host. The addresses identify locations in memory at the host from which the FTL data can be read by the SSD. These commands are examples as other commands can be used as well.

Figure 12A:
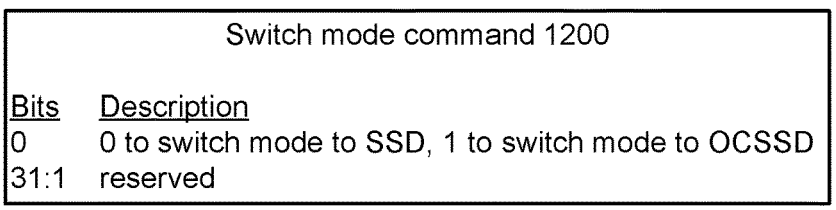
FIG. 12A depicts an example command for switching the mode of an SSD, consistent with the first command of FIG. 11.

FIG. 12A depicts an example command 1200 for switching the mode of an SSD, consistent with the first command of FIG. 11. A first bit (bit 0) can be set to 0 to indicate a mode switch from OCSSD to SSD, or 1 to indicate a mode switch from SSD to OCSSD. The remaining bits are reserved for other purposes. This example mode switching command uses 32 bits or 4 bytes. It can be implemented, e.g., using the command DWORD 10 in the Open-Channel Solid-State Drives Specification, Revision 2.0, Jan. 29, 2018 (LightNVM).

Figure 12B:
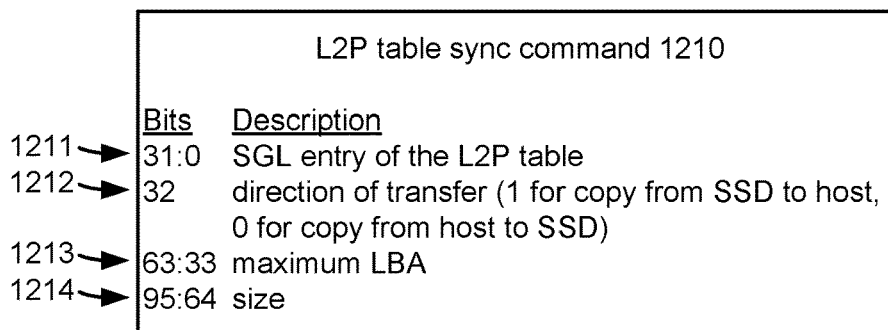
FIG. 12B depicts an example command for synchronizing an L2P table, consistent with the second command of FIG. 11.

FIG. 12B depicts an example command 1210 for synchronizing an L2P table, consistent with the second command of FIG. 11. In a set of consecutive bits, a set of 32 bits (subset 1211) identifies a scatter gather list (SGL) entry of the L2P table. A SGL is used to provide data in a contiguous manner even when the data is stored in non-contiguous segments of a memory. An SGL entry stores the respective starting addresses of the non-contiguous segments of the memory in which the data is stored. A controller can use the SGL entry to access the L2P table data as contiguous set of bytes, for example.

Another bit (subset 1212) identifies a direction of transfer of the L2P table. A "1" may denote copying or synchronizing from the SSD to the host, and a "0" may denote copying or synchronizing from the host to the SSD. This allows the same command structure to be used for both types of mode switching—from traditional SSD to OCSSD, and from OCSSD to traditional SSD.

A set of 31 bits (subset 1213) identifies a maximum logical block address (LBA) such as in the address space in FIG. 8. The maximum LBA indicates the maximum user logical block number allowed by the FTL and, indirectly, sets the over provisioning or the number of extra blocks.

A final set of 32 bits (subset 1214) identifies a size of the L2P table.

The command can provide a source or destination address in a memory device such as a RAM in the host or SSD, and a size of the data which is to be copied. Once the transfer of the L2P table or other FTL data is completed by the host or SSD, it can send a confirmation message to the other component (the SSD or host, respectively).

This example L2P table sync command uses 96 bits or 12 bytes. It can be implemented, e.g., using the commands DWORD 10, DWORD 11 and DWORD 12 in the Open-Channel Solid-State Drives Specification. DWORD denotes a double word comprising 4 bytes or 32 bits.

Figure 12C:
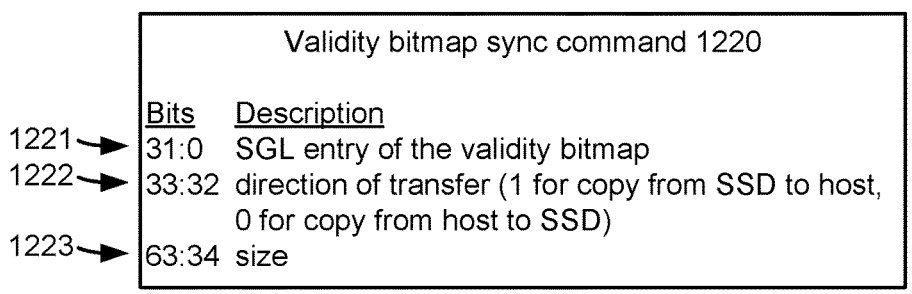
FIG. 12C depicts an example command for synchronizing a validity bitmap, consistent with the third command of FIG. 11.

FIG. 12C depicts an example command 1220 for synchronizing a validity bitmap, consistent with the third command of FIG. 11. In a set of consecutive bits, a set of 32 bits (subset 1221) identifies a SGL entry of the validity bitmap. A controller can use the SGL entry to access the validity bitmap data as contiguous set of bytes. Another bit (subset 1222) identifies a direction of transfer of the validity bitmap, and is analogous to the bit 1212 of FIG. 12B. A final set of 32 bits (subset 1223) identifies a size of the validity bitmap. A validity bitmap can be provided for each block or chunk.

This example validity bitmap sync command uses 64 bits or 8 bytes. It can be implemented, e.g., using the commands DWORD 10 and DWORD 11 in the Open-Channel Solid-State Drives Specification.

Figure 12D:
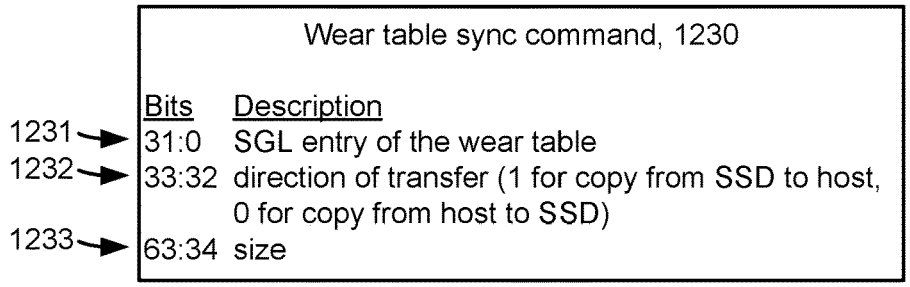
FIG. 12D depicts an example command for synchronizing a wear table, consistent with the fourth command of FIG. 11.

FIG. 12D depicts an example command 1230 for synchronizing a wear table, consistent with the fourth command of FIG. 11. In a set of consecutive bits, a set of 32 bits (subset 1231) identifies a SGL entry of the wear table. A controller can use the SGL entry to access the wear table data as contiguous set of bytes. Another bit (subset 1232) identifies a direction of transfer of the wear table, and is analogous to the bit 1212 of FIG. 12B. A final set of 32 bits (subset 1233) identifies a size of the wear table.

This example wear table sync command uses 64 bits or 8 bytes. It can be implemented, e.g., using the commands DWORD 10 and DWORD 11 in the Open-Channel Solid-State Drives Specification.

The commands of FIG. 12A-12D can be vendor-unique commands. That is, for a given device such as a host or SSD, the manufacturer or vendor of the device can define the commands using a format which is different from the format of other manufacturers or vendors. In other examples, a combination of vendor-unique commands, controller register writes and sideband signals can be used to instruct the SSD to change its mode. In another example, the host can use vendor-defined log page writes to sync/transfer the L2P table to the SSD.

In one approach, the commands identify different types of data of the flash translation layer processes and respective addresses of the different types of data at the solid-state device.

The commands can comprises a set of consecutive bits in which different predetermined subsets of the set of consecutive bits are reserved for different types of FTL data. For example, in FIG. 12B, the command to synchronize the logical-to-physical address table comprises a set of consecutive bits 1211-1214 in which a first predetermined subset 1211 of the set of consecutive bits is reserved for the scatter gather list entry, a second predetermined subset 1213 of the set of consecutive bits is reserved for the maximum logical block address, and a third predetermined subset 1214 of the set of consecutive bits is reserved for the size of the logical-to-physical address table.

In FIG. 12C, the command to synchronize the validity bitmap comprises a set of consecutive bits 1221-1223 in which a first predetermined subset 1221 of the set of consecutive bits is reserved for the scatter gather list entry, and a second predetermined subset 1223 of the set of consecutive bits is reserved for a size of the validity bitmap.

FIGS. 13A and 13B are consistent with FIG. 11A, and FIGS. 13C and 13D are consistent with FIG. 11B.

FIG. 13A depicts an example process at a host for transitioning an SSD from a traditional SSD to an OCSSD. At step 1300, the host transmits a switch mode command (such as in FIG. 12A) to the SSD to transition from a traditional SSD to an OCSSD. At step 1301, the host receives a command from the SSD to synchronize (sync) or copy FTL data to the host. As discussed, examples of FTL include an L2P table, a validity bitmap and a wear table. Commands such as depicted in FIG. 12B-12D may be used. At step 1302, in response to the command, the host transmits a read request for FTL data to the SSD and receives the data in response to the request. A decision step 1303 determines if there is a next command in the mode switching process. If there is a next command, steps 1301 and 1302 are repeated. If there is no further command, the host marks all blocks for recycling at step 1304. At step 1305, the host waits for the blocks to recycle. The host transmits a confirmation to the SSD indicating that the transition is complete, at step 1306. At step 1307, the host updates a configuration file to indicate that the OCSSD mode is active.

FIG. 13B depicts an example process at an SSD which is a counterpart of the process of FIG. 13A. At step 1310, the SSD receives a switch mode command from the host to transition from a traditional SSD to an OCSSD. At step 1311, the SSD transmits a command to the host to sync FTL data to the host. At step 1312, in connection with the command, the SSD receives a read request for FTL data from the host and transmits the requested data to the host. A decision step 1313 determines if there is a next command in the mode switching process. If there is a next command, steps 1311 and 1312 are repeated. If there is no further command, the SSD receives a confirmation from the host indicating that the transition is complete, at step 1314. At step 1315, the SSD updates a configuration file to set the current mode to OCSSD. This indicates a role of the SSD has changed from a traditional solid-state device to an open-channel solid-state device FIG. 13C depicts an example process at a host for transitioning an SSD from an OCSSD to a traditional SSD. At step 1320, the host transmits a switch mode command to the SSD to transition from OCSSD to a traditional SSD. At step 1321, the host prepares data of flash translation layer (FTL) to sync (e.g., L2P table, validity bitmap for each chunk of data, and wear table). At step 1322, the host transmits a command to the SSD to sync FTL data to the SSD. At step 1323, in connection with the command, the host receives a read request from the SSD for the FTL data, and transmits the data to the SSD in response. A decision step 1324 determines if there is a next command in the mode switching process. If there is a next command, steps 1322 and 1323 are repeated. If there is no further command, the host receives a confirmation from the SSD indicating that the transition is complete, at step 1325. At step 1326, the host updates a configuration file to indicate that the OCSSD mode is not active.

FIG. 13D depicts an example process at an SSD which is a counterpart of the process of FIG. 13C. At step 1330, the SSD receives a switch mode command from the host to transition from an OCSSD to a traditional SSD. At step 1331, the SSD receives a command from the host to sync FTL data to the SSD. At step 1332, in connection with the command, the SSD transmits a read request to the host for the FTL data, and receives the data from the host in response. A decision step 1333 determines if there is a next command in the mode switching process. If there is a next command, steps 1331 and 1332 are repeated. If there is no further command, the SSD marks all blocks for recycling at step 1334. At step 1335, the SSD waits for the blocks to recycle. At step 1336, the SSD updates a configuration file to set the current mode to traditional SSD. This indicates that a role of the SSD has changed from an OCSSD to a traditional SSD. At step 1337, the SSD transmits a confirmation to the host indicating that the transition is complete.

During the recycling of the blocks, the SSD can service read requests but write requests have to wait until completion of the recycling. The recycle step ensures that all the data blocks are rewritten with the updated FTL meta-data in a format which is compatible with the SSD. During recycling, the validity bitmap is used to identify pages to recycle from the chunk. Chunks which are completely invalid are set as free and can be erased just before the next programming.

Generally, when changing the role at the SSD, the role at host end is also changed. The host can change from having no FTL data to having some or all of the FTL data.

Figure 14A:
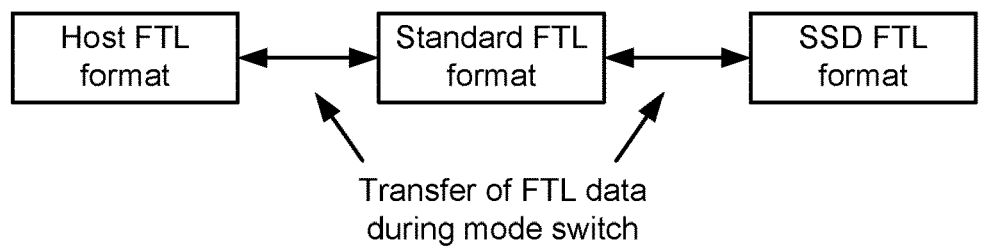
FIG. 14A depicts the transfer of FTL data between a host and an SSD, consistent with FIG. 13A-13D.

FIG. 14A depicts the transfer of FTL data between a host and an SSD, consistent with FIG. 13A-13D. In the techniques described herein, the FTL data, also referred to as data structures or meta-data, can be transferred between the host and the SSD in a standard format which is recognizable to both the host and SSD. The figure depicts a host FTL format, a standard FTL format and an SSD FTL format in different blocks. The arrows between the blocks represent a transfer of FTL data during a mode switch. The host is free to store the FTL data in a specific format which is different than a format in which the SSD stores the FTL data.

Examples of FTL data format variables were discussed previously. In one example, the host stores the FTL data in a compressed format, and the standard FTL format is for uncompressed data. In this case, the host decompresses the FTL data and provides it as uncompressed FTL data to the SSD in the standard FTL format. When the SSD receives and stores the FTL data, it can store it in the uncompressed format in which it is received or compress and store it using its own compression format, which can be the same as or different than the compression format of the host.

In another example, the host stores the FTL data using a first compression format, and the standard FTL format is for a second compression format. In this case, the host converts the FTL data from the first compression format to the second compression format and provides it in the second compression format to the SSD. When the SSD receives and stores the FTL data, it can store it in the second compression format in which it is received or compress and store it using its own compression format, which can be the same as or different than the first compression format of the host.

In another example, the host stores the FTL data using the Big-Endian byte order, and the standard FTL format is for the Little-Endian byte order. In this case, the host converts the FTL data from the Big-Endian byte order to the Little-Endian byte order before the FTL data is provided to the SSD. When the SSD receives and stores the FTL data, it can store it in the Little-Endian byte order in which it is received or store it using the Big-Endian byte order.

Similar examples can apply to the transfer of FTL data from the SSD to the host. Many other examples are also possible.

The transfer of the FTL data can use, e.g., commands which are compatible with the NVM Express™ interface. This interface allows host software to communicate with a non-volatile memory subsystem. This interface is optimized for Enterprise and Client solid-state drives, typically attached as a register level interface to the PCI Express interface Once the FTL meta-data is transferred, it can be used to perform a full drive recycle to restore the blocks in the compatible format. In this manner, a mode switch is achieved without data loss. Moreover, there is no need to obtain an external backup of the FTL data, which is sometimes not feasible.

Figure 14B:
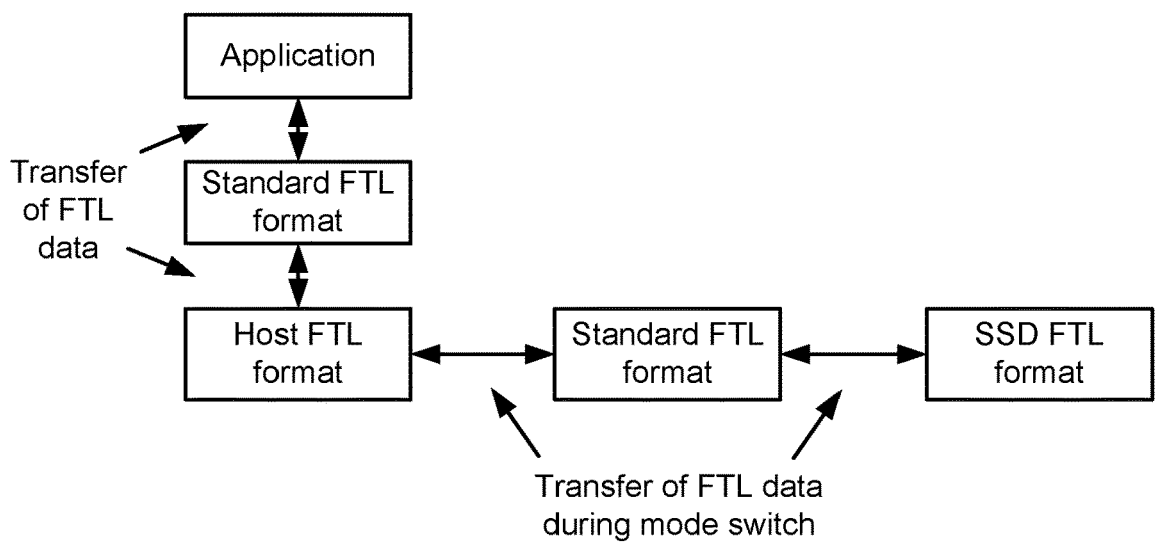
FIG. 14B depicts the transfer of FTL data between the host and another application.

FIG. 14B depicts the transfer of FTL data between the host and another application. An application other than that used at the host currently to perform the functions of the OCSSD mode, can begin to perform the functions of the OCSSD mode when interacting with the SSD. For example, the host may be a server which initially performs the functions of the OCSSD mode. Subsequently, another application, which may be at the same server as the host or at another server or computing device, takes over the functions of the OCSSD mode. In one approach, the host can transfer the FTL data to the other application using the standard FTL format. This allows the other application to receive the FTL data in the standard format and convert it for use in its own format.

Figure 15:
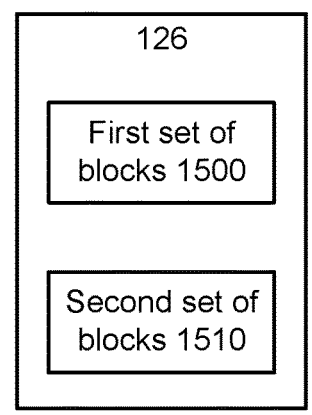
FIG. 15 depicts different parts of a memory cell array being used in SSD and OCSSD modes.

In another approach, the host can transfer the FTL data to the other application using the same format as is used by the host, if the host knows that the other application uses the same format. FIG. 15 depicts different parts of a memory cell array being used in SSD and OCSSD modes. As mentioned, depending upon an application's latency requirements, the host might use an array partially as an OCSSD (where the host maintains the FTL data) and partially as a traditional flash array where the array maintains the FTL data. For example, a memory cell array, such as the memory structure 126 of FIG. 1, can comprise a first set of blocks 1500 and a second set of blocks 1510. The first set of blocks can be used in the SSD mode while the second set of blocks is used in the OCSSD mode, for example. Or, the first set of blocks can be used in the OCSSD mode while the second set of blocks is used in the SSD mode.

In either case, FTL data for the first set of blocks can be maintained separately from FTL data for the second set of blocks. For instance, when the first set of blocks is in the SSD mode, respective FTL data is maintained by the controller 122, for example. When the second set of blocks is in the OCSSD mode, respective FTL data is maintained by the host, for example.

Moreover, the number of blocks in the sets 1500 and 1510 can change over time.

Accordingly, it can be seen that, in one implementation, an apparatus comprises: a plurality of blocks of memory cells and a control circuit arranged in a solid-state device, the control circuit manages flash translation layer processes for the plurality of blocks, and the control circuit, to transition managing of the flash translation layer processes from the solid-state device to a host, is configured to: transmit a command to the host to synchronize a logical-to-physical address table; and transmit a command to the host to synchronize a validity bitmap.

In another implementation, a method comprises: receiving a first command at a solid-state device to synchronize a logical-to-physical address table of a host, the first command comprising a scatter gather list entry of respective addresses of the logical-to-physical address table; in response to the first command, read the logical-to-physical address table from the host using the respective addresses; receiving a second command at the solid-state device to synchronize a validity bitmap of the host, the second command comprising a scatter gather list entry of respective addresses of the validity bitmap; in response to the second command, read the validity bitmap from the host using the respective addresses; recycling a plurality of blocks of memory cells of the solid-state device; and in response to completion of the recycling, updating a configuration file to indicate that a role of the solid-state device has changed from an open-channel solid-state device in which flash translation layer processes are managed by the host to a traditional solid-state device in which the flash translation layer processes are managed by the solid-state device.

In another implementation, a method at a host comprises: transmitting a command to a solid-state device to transition the solid-state device from a traditional solid-state device in which flash translation layer processes are managed by the solid-state device to an open-channel solid-state device in which the flash translation layer processes are managed by the host; in response to the command to transition the solid-state device from the traditional solid-state device to the open-channel solid-state device, receiving from the solid-state device, commands identifying different types of data of the flash translation layer processes and respective addresses of the different types of data at the solid-state device; in response to the commands, reading the different types of data from the solid-state device using the respective addresses; and managing the flash translation layer processes using the different types of data of the flash translation layer.

In another implementation, a method comprises: receiving a command at a solid-state device to transition the solid-state device from a traditional solid-state device in which flash translation layer processes are managed by the solid-state device to an open-channel solid-state device in which the flash translation layer processes are managed by a host; and in response to the command to transition the solid-state device from the traditional solid-state device to the open-channel solid-state device, transmitting from the solid-state device to the host, commands identifying different types of data of the flash translation layer processes and respective addresses of the different types of data at the solid-state device to allow the host to read the different types of data from the solid-state device using the respective addresses and manage the flash translation layer processes using the different types of data of the flash translation layer.

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. An apparatus, comprising:
a plurality of blocks of memory cells and a control circuit arranged in a solid-state device, the control circuit manages flash translation layer processes for the plurality of blocks, and the control circuit, to transition managing of the flash translation layer processes from the solid-state device to a host, is configured to:
transmit a command to the host to synchronize a logical-to-physical address table; and
transmit a command to the host to synchronize a validity bitmap.

2. The apparatus of claim 1, wherein:
the control circuit is configured to, in response to a confirmation from the host indicating that the transition is complete, update a configuration file to indicate that a role of the solid-state device has changed from a traditional solid-state device to an open-channel solid-state device.

3. The apparatus of claim 1, wherein the command to synchronize the logical-to-physical address table identifies:
a scatter gather list entry of the logical-to-physical address table;
a maximum logical block address; and
a size of the logical-to-physical address table.

4. The apparatus of claim 3, wherein the command to synchronize the logical-to-physical address table comprises:
a bit indicating that the logical-to-physical address table is to be copied to the host.

5. The apparatus of claim 3, wherein:
the command to synchronize the logical-to-physical address table comprises a set of consecutive bits in which a first predetermined subset of the set of consecutive bits is reserved for the scatter gather list entry, a second predetermined subset of the set of consecutive bits is reserved for the maximum logical block address, and a third predetermined subset of the set of consecutive bits is reserved for the size of the logical-to-physical address table.

6. The apparatus of claim 1, wherein the command to synchronize the validity bitmap identifies:
a scatter gather list entry of the validity bitmap; and
a size of the validity bitmap.

7. The apparatus of claim 6, wherein the command to synchronize the validity bitmap comprises:
a bit indicating that the validity bitmap is to be copied to the host.

8. The apparatus of claim 6, wherein:
the command to synchronize the validity bitmap comprises a set of consecutive bits in which a first predetermined subset of the set of consecutive bits is reserved for the scatter gather list entry, and a second predetermined subset of the set of consecutive bits is reserved for a size of the validity bitmap.

9. The apparatus of claim 1, wherein the control circuit, to transition managing of the flash translation layer processes from the solid-state device to the host, is configured to transmit a command to the host to synchronize a wear table of the flash translation layer, the command to synchronize the wear table comprises:
bits identifying a scatter gather list entry of the wear table; and
bits indicating a size of the wear table.

10. The apparatus of claim 9, wherein the command to synchronize the wear table comprises:
a bit indicating that the wear table is to be copied to the host.

11. The apparatus of claim 1, wherein:
the control circuit is configured to begin to transition the managing of the flash translation layer processes in response to receiving a switch mode command from the host, the switch mode command comprises a bit indicating that the managing of the flash translation layer processes is be transitioned from the solid-state device to the host.

12. The apparatus of claim 1, wherein:
a format in which the logical-to-physical address table is stored in the solid-state device is different than a format in which the logical-to-physical address table is stored in the host.

13. The apparatus of claim 1, wherein:
the commands are transmitted using reserved data words in an interface specification which interfaces the host to the solid-state device.

14. A method, comprising:
receiving a first command at a solid-state device to synchronize a logical-to-physical address table of a host, the first command comprising a scatter gather list entry of respective addresses of the logical-to-physical address table;
in response to the first command, read the logical-to-physical address table from the host using the respective addresses;
receiving a second command at the solid-state device to synchronize a validity bitmap of the host, the second command comprising a scatter gather list entry of respective addresses of the validity bitmap;
in response to the second command, read the validity bitmap from the host using the respective addresses;
recycling a plurality of blocks of memory cells of the solid-state device; and
in response to completion of the recycling, updating a configuration file to indicate that a role of the solid-state device has changed from an open-channel solid-state device in which flash translation layer processes are managed by the host to a traditional solid-state device in which the flash translation layer processes are managed by the solid-state device.

15. The method of claim 14, wherein:
the recycling ensures that the plurality of blocks of memory cells are rewritten using the logical-to-physical address table and the validity bitmap in a format which is compatible with the solid-state device.

16. The method of claim 14, further comprising:
during the recycling, using the validity bitmap to identify pages of data which are to be recycled from a chunk of data, the chunk of data comprising one or more blocks of the plurality of blocks.

17. The method of claim 14, further comprising:
during the recycling, setting free a chunk of data which is invalid according to the validity bitmap, the chunk of data comprising one or more blocks of the plurality of blocks.

18. The method of claim 14, further comprising:
receiving a third command at the solid-state device to synchronize a wear table of the host, the third command comprising a scatter gather list entry of respective addresses of the wear table; and
in response to the third command, read the wear table from the host using the respective addresses.

19. A method, comprising:
receiving a command at a solid-state device to transition the solid-state device from a traditional solid-state device in which flash translation layer processes are managed by the solid-state device to an open-channel solid-state device in which the flash translation layer processes are managed by a host; and
in response to the command to transition the solid-state device from the traditional solid-state device to the open-channel solid-state device, transmitting from the solid-state device to the host, commands identifying different types of data of the flash translation layer processes and respective addresses of the different types of data at the solid-state device to allow the host to read the different types of data from the solid-state device using the respective addresses and manage the flash translation layer processes using the different types of data of the flash translation layer.

20. The method of claim 19, wherein:
the different types of data of the flash translation layer comprise at least one of a logical-to-physical address table, a validity bitmap or a wear table.

* * * * *